US005623819A

United States Patent [19]
Bowker et al.

[11] Patent Number: 5,623,819
[45] Date of Patent: Apr. 29, 1997

[54] METHOD AND APPARATUS FOR SEQUENTIALLY STAGED COMBUSTION USING A CATALYST

[75] Inventors: Jeffrey C. Bowker, Gibsonia; Dennis M. Bachovchin, Delmont, both of Pa.

[73] Assignee: Westinghouse Electric Corporation, Pittsburgh, Pa.

[21] Appl. No.: 567,864

[22] Filed: Dec. 6, 1995

Related U.S. Application Data

[63] Continuation of Ser. No. 255,858, Jun. 7, 1994, abandoned.
[51] Int. Cl.$^6$ .................................. F23R 3/34; F23R 3/40
[52] U.S. Cl. .............................. 60/39.06; 60/723; 60/747
[58] Field of Search ........................ 60/39.06, 723, 60/746, 747

[56] References Cited

U.S. PATENT DOCUMENTS

| | | | |
|---|---|---|---|
| 2,624,172 | 1/1953 | Houdry | 60/723 |
| 3,797,231 | 3/1974 | McLean | 60/39.51 |
| 3,846,979 | 11/1974 | Pfefferle | 60/39.04 |
| 3,928,961 | 12/1975 | Pfefferle | 60/39.02 |
| 3,938,326 | 2/1976 | DeCorso et al. | 60/39.74 |
| 3,943,705 | 3/1976 | DeCorso et al. | 60/39.74 |
| 4,040,252 | 8/1977 | Mosier et al. | 60/39.36 |
| 4,072,007 | 2/1978 | Sanday | 60/39.69 |
| 4,112,675 | 9/1978 | Pillsbury et al. | 60/39.06 |
| 4,870,824 | 10/1989 | Young et al. | 60/723 |
| 5,235,804 | 8/1993 | Colket et al. | 60/723 |

OTHER PUBLICATIONS

G. Sturgess, "Advanced Low Emissions Catalytic Combustor Program at Pratt S. Whitney," NASA Conference Publication (1979).

S. DeCorso et al., "Catalyst for Gas Turbine Combustors–Experimental Test Results," Journal of Engineering for Power (Apr. 1977).

Pfefferle, et al., "The Influence of Catalytic Activity on the Ignition of Boundary Layer Flows, Part I: Hydroxy Radical Measurements," Combustion and Flame 76: 325–338 (1989).

Pfefferle, et al., "Planar laser–induced fluorescence of OH in a chemically reacting boundary layer," Applied Optics, vol. 27, No. 15, pp. 3197–3202 (Aug. 1988).

Talley, et al., "Laser Diagnostics of Matrix–Isolated OH Radicals From Oxidation of $H_2$ on Platinum," Chemical Physics Letters, vol. 66, No. 3, pp. 584–586 (Oct. 1979).

Dyer et al., "Laser–induced fluorescence measurement of oxygen atoms above a catalytic combustor surface," Applied Optics, vol. 29, No. 1, pp. 111–118 (Jan. 1990).

Cattolica, et al., "The Effect of Surface Chemistry on the Development of the [OH] in a Combustion Boundary Layer," Nineteenth Symposium (International) on Combustion/The Combustion Institute, pp. 311–318 (1982).

Marks, et al., "Hydroxyl radical desorption in catalytic combustion," Chemical Physics Letters, vol. 178, No. 4, pp. 358–362 (Mar. 1991).

(List continued on next page.)

*Primary Examiner*—Louis J. Casaregola

[57] ABSTRACT

A low NOx generating combustor in which a first lean mixture of fuel and air is pre-heated by transferring heat from hot gas discharging from the combustor. The preheated first fuel/air mixture is then catalyzed in a catalytic reactor and then combusted so as to produce a hot gas having a temperature in excess of the ignition temperature of the fuel. Second and third lean mixtures of fuel and air are then sequentially introduced into the hot gas, thereby raising their temperatures above the ignition temperature and causing homogeneous combustion of the second and third fuel air mixtures. This homogeneous combustion is enhanced by the presence of the free radicals created during the catalyzation of the first fuel/air mixture. In addition, the catalytic reactor acts as a pilot that imparts stability to the combustion of the lean second and third fuel/air mixtures.

15 Claims, 4 Drawing Sheets

OTHER PUBLICATIONS

Tevault, et al., "Matrix isolation and laser diagnostic studies of catalytic oxidation of $H_2$ and $D_2$ on platinum," J. Chem. Phys. vol. 72, No. 5, pp. 3314–3319, (Mar. 1980).

Pfefferle, et al., "The Influence of Catalytic Activity on the Gas Phase Ignition of Boundary Layer Flows Part II. Oxygen Atom Measurements," Combustion and Flame 76: 339–349 (1989).

Ozawa, et al., "Test Result of Low $No_x$ Catalytic Combustor for Gas Turbine," ASME paper 93–GT–344 (May 24–27, 1993).

Arai, et al., "Recent Progress in High–Temperature Catalytic Combustion," Catalysis Today, vol. 10, pp. 81–94 (1991).

Trimm, "Catalytic combustion", Studies in Inorganic Chemistry pp. 60–74 (1991).

W. Dodds, "Advanced Low Emissions Catalytic Combustor Program at General Electric," NASA Conference Publication (1979).

METHOD AND APPARATUS FOR SEQUENTIALLY STAGED COMBUSTION USING A CATALYST

This application is a continuation of application Ser. No. 08/255,858 filed Jun. 7, 1994 (abandoned).

BACKGROUND OF THE INVENTION

The present invention relates to a combustor. More specifically, the present invention relates to a combustor, such as a combustor for use in gas turbines and the like, in which combustion is sequentially staged using a catalyst.

In a gas turbine, fuel is burned in compressed air, produced by a compressor, in one or more combustors. Traditionally, such combustors had a primary combustion zone in which an approximately stoichiometric mixture of fuel and air was formed and burned in a diffusion type combustion process under essentially homogeneous conditions. Additional air was introduced into the combustor downstream of the primary combustion zone. Although the overall fuel/air ratio was considerably less than stoichiometric, the fuel/air mixture was readily ignited at start-up and good flame stability was achieved over a wide range in firing temperatures due to the locally richer nature of the fuel/air mixture in the primary combustion zone.

Unfortunately, use of such approximately stoichiometric fuel/air mixtures resulted in very high local temperatures in the primary combustion zone. Such high temperatures promoted the formation of oxides of nitrogen ("NOx"), considered an atmospheric pollutant. It is known that combustion at lean fuel/air ratios (sometimes referred to as "lean pre-mix combustion") reduces NOx formation by reducing the maximum local gas temperatures. However, such lean mixtures are difficult to ignite and exhibit poor flame stability. Although ignition and stability can be improved by the use of diffusion type combustion from a centrally disposed pilot burner, the use of such a pilot will increase the NOx generation and, thereby, provide a lower limit on the NOx generation.

Accordingly, it has been proposed to employ a combustion catalyst in a heterogeneous combustion process. The creation of free radicals in the catalyzed fuel/air mixture has the effect of reducing the activation energy associated with the combustion reactions. Consequently, the combustion temperature can be more readily maintained below the level at which molecular nitrogen will be converted to NOx (sometimes referred to as "thermal NOx"). Moreover, even at temperatures favoring the formation of thermal NOx, the NOx generation rate will be decreased because the catalyzation of the fuel/air mixture will enhance the ability of the fuel to compete with nitrogen for the available oxygen.

Catalytic combustion has been proposed in various modes, including flowing all of the fuel/air mixture through a catalytic combustor preceded by a pilot burner or operating a catalytic combustor in parallel with a lean pre-mix combustor. In any case, the catalytic process requires that the fuel/air mixture be preheated, generally to a temperature of at least 400° C. Unfortunately, the compressed air produced by a gas turbine compressor may be lower than 400° C. Therefore, a diffusion type pre-heating burner is often required. However, as in a lean pre-mix type combustor, the pre-heating burner can create sufficient NOx to undermine the ability of the catalytic combustor to meet ultra-low emission requirements.

It is therefore desirable to provide a combustor capable of stable combustion with very lean mixtures of fuel and air, so as to reduce the formation of NOx, without the use of a NOx generating pilot.

SUMMARY OF THE INVENTION

Accordingly, it is the general object of the current invention to provide a combustor capable of stable combustion with very lean mixtures of fuel and air, so as to reduce the formation of NOx, without the use of a NOx generating pilot.

Briefly, this object, as well as other objects of the current invention, is accomplished in a combustor for burning a fuel in air comprising (i) means for mixing a first flow of fuel into a first flow of air in a mixing zone, thereby producing a first fuel/air mixture, (ii) a combustion catalyst, (iii) means for directing the first fuel/air mixture through the catalyst so as to produce a catalyzed fuel/air mixture, (iv) a first combustion zone in which the catalyzed fuel/air mixture is combusted, thereby producing a combusted gas, (v) a second combustion zone disposed downstream of the first combustion zone, and means for directing the combusted gas from the first combustion zone to the second combustion zone, and (vi) means for mixing a second fuel/air mixture into the hot gas in the second combustion zone and combusting the second fuel/air mixture, thereby producing a further combusted gas.

In one embodiment of the current invention, the combustor has (i) a third combustion zone disposed downstream of the second combustion zone, (ii) means for directing the further combusted gas from the second combustion zone to the third combustion zone, and (iii) means for mixing a third fuel/air mixture into the further combusted gas in the third combustion zone and combusting the third fuel/air mixture.

According to one aspect of the current invention, the combustor has means for heating the first fuel/air mixture prior to directing the first fuel/air mixture through the combustion catalyst. In this embodiment, the means for heating the first fuel/air mixture comprises means for transferring heat from the further combusted gas to the first fuel/air mixture.

The current invention also encompasses a method of combusting a fuel in air, comprising the steps of (i) mixing a first flow of fuel into a first flow of air so as to form a first fuel/air mixture, (ii) flowing the first fuel/air mixture through a combustion catalyst, thereby producing a catalyzed fuel/air mixture, (iii) combusting the catalyzed fuel/air mixture, thereby producing a combusted gas, (iv) mixing a second flow of fuel into a second flow of air so as to form a second fuel/air mixture, and (v) combusting the second fuel/air mixture by mixing the second fuel/air mixture into the combusted gas so as to raise the temperature of the second fuel/air mixture above its ignition temperature, thereby producing a further combusted gas.

DESCRIPTION OF THE PREFERRED EMBODIMENT

Figure 1:
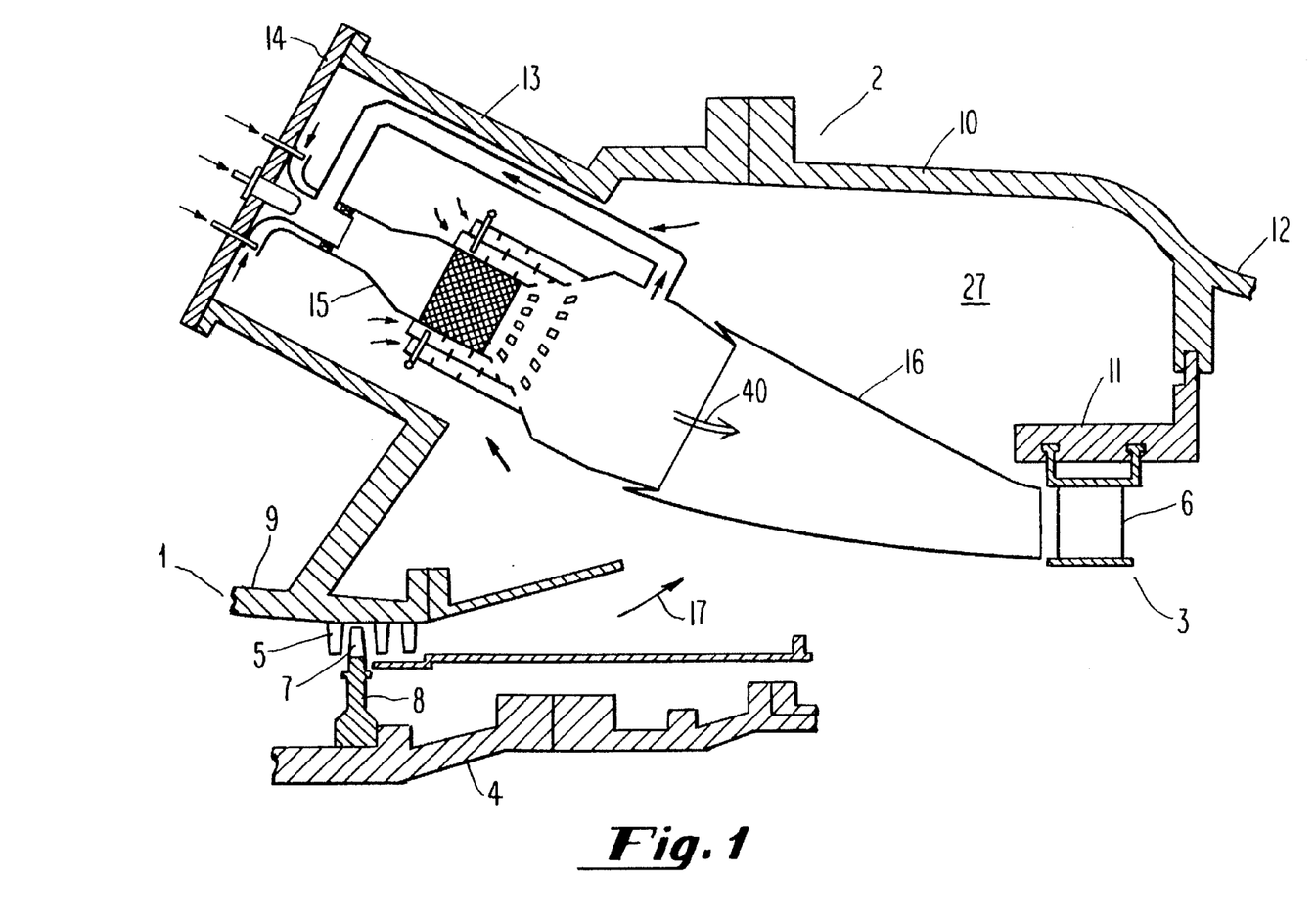
FIG. 1 is a longitudinal cross-section through a portion of a gas turbine in the vicinity of the combustor according to the current invention.

Referring to the drawings, there is shown in FIG. 1 a longitudinal cross-section through the portion of a gas turbine in the vicinity of the combustion section. The gas turbine is comprised of a compressor section 1, a combustion section 2, a turbine section 3 and a rotor 4 that extends through these three sections. The compressor is comprised of a plurality of alternating rows of stationary vanes 5 and rotating blades 7. The vanes are affixed to a cylinder 9 and the blades are affixed to discs 8 mounted on the rotor 4. As is conventional, the combustion section 2 is comprised of a cylinder 10 that forms a chamber 27 in which a plurality of combustors 15 and ducts 16 are disposed. The turbine section 3 is comprised of a plurality of alternating rows of stationary vanes 6 and rotating blades (not shown). The vanes 6 are affixed to an inner cylinder 11 (only a portion of which is shown) that is enclosed by an outer cylinder 12.

During operation, the compressor 2 inducts ambient air and compresses it. The compressed air 17 from the compressor 1 is then directed to the chamber 27, which distributes it to the combustors 15. In the combustors 15, a fuel, which may be liquid (such as distillate oil) or gaseous (such as natural gas), is burned in the compressed air 17, as discussed further below, so as to produce a hot compressed gas 40. The hot gas 40 is directed to the turbine section 3 by the ducts 16. In the turbine section, the hot compressed gas 40 is expanded, thereby producing power in the rotor 4.

Figure 2:
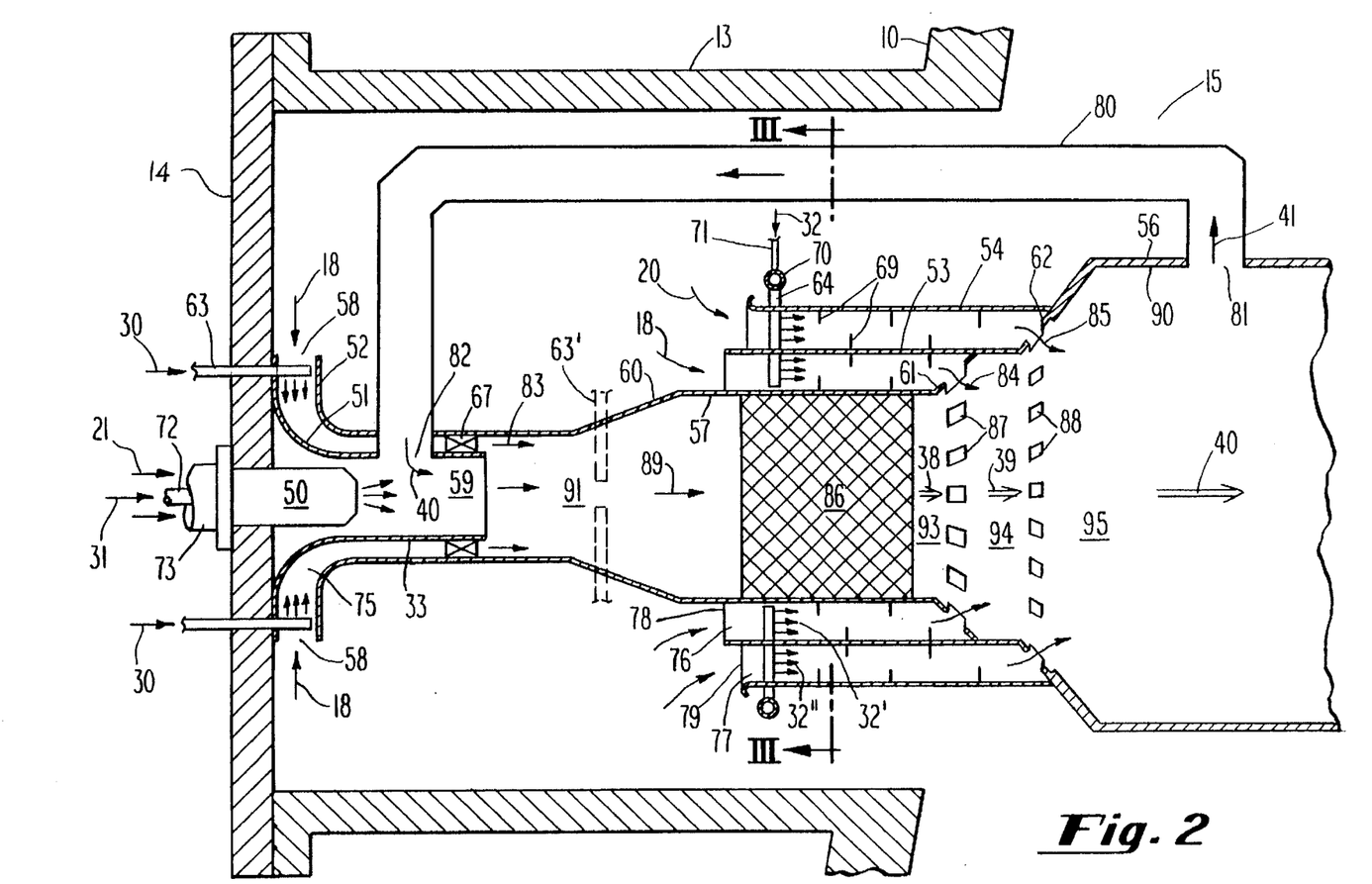
FIG. 2 is a detailed view of the combustor shown in FIG. 1.

As shown in FIG. 2, each combustor 15 extends into a barrel 13 that extends from the cylinder 10 and that is sealed by an end plate 14. The front end of the combustor 15 is formed by inner and outer concentric liners 51 and 52, respectively. The liners 51 and 52 form an annular passage 75 between themselves having a circumferential inlet 58 that receives a first portion 18 of the compressed air 17 from the compressor 1. In the preferred embodiment, the compressed air 18 is equal to about 20% of the total combustion air for the combustor 15. From the inlet 58, the passage 75 initially extends radially inward and then turns 90° and extends axially.

A plurality of axially extending fuel supply bars 63 are circumferentially distributed in the passage 75 just down stream of the inlet 58. A plurality of fuel outlet ports are distributed along the length of each of the fuel supply bars 63 that extends in the passage 75. Consequently, the fuel supply bars 63 serve to well distribute a first portion 30 of the fuel around the passage 75, thereby forming a lean fuel/air mixture 83. Swirlers 67, which may be of the vane type, are optionally distributed around the passage 75 and serve to aid in the mixing of the fuel 30 and compressed air 18. In the preferred embodiment, the flow rate of the fuel 30 introduced by the fuel supply bars 63 into the compressed air 18 is regulated so that an equivalence ratio of less than 0.5 is maintained in the passage 75—equivalence ratio being defined as the ratio of the actual fuel/air ratio to the stoichiometric fuel/air ratio.

From the passage 75, the fuel/air mixture 83 enters a pre-heat zone 91. In the preferred embodiment, pre-heating of the fuel/air mixture 83 is accomplished in two ways. During start-up, a supplemental fuel 31 from fuel supply pipe 72 is introduced by a fuel nozzle 50, which may be a conventional spray type, into a passage 59 formed by the inner liner 51. Air 21 from a conduit 73 is also introduced into the passage 59 so as to create a rich fuel/air mixture that is ignited by an ignitor (not shown), which may be of the conventional spark type, and burned so as to produce a very stable diffusion-type flame. The hot gas produced by the combustion of the supplemental fuel 31 mixes with the lean fuel/air mixture 83 from the passage 75 in the pre-heat zone 91, thereby raising the temperature of the fuel/air mixture 83 into the range suitable for being catalyzed, as discussed further below. In the preferred embodiment, the fuel/air mixture 83 is heated to approximately 400° C.

In one embodiment of the invention, the combustor 15 is operated continuously with the diffusion-type combustion from the fuel nozzle 50 as a source of pre-heat. However, the size of the pre-heating flame is much smaller than that required for conventional non-catalytic lean premix combustors since, according to the current invention, only 20% of the air flow must be pre-heated and then only to a much lower temperature. Thus, NOx generation is greatly reduced. In another embodiment of the invention, after stable operation of the combustor 15 has been achieved, the supplemental fuel 31 is shut off. Thereafter, pre-heating is accomplished by transferring heat from the hot gas 40, which is being discharged from the combustor 15, to the lean fuel/air mixture 83.

In the embodiment shown in FIG. 2, this heat transfer is accomplished by drawing a portion 41 of the hot gas 40 discharging from the combustor 15 through a duct 80 and then mixing it into the fuel/air mixture 83 in the pre-heat zone 91. The duct 80 connects an inlet port 81, formed in a liner 56, that is in flow communication with a combustion zone 95 (as discussed further below, the combustion zone 95 is the third of three combustion zones). The duct 80 connects the inlet port 81 to an outlet port 82 formed in the inner liner 51. As a result of the high axial velocity of the fuel/air mixture 83 flowing around it, the axially extending portion of the inner liner 51 forms an eductor 33 that draws the hot gas 41 from the third combustion zone 95.

Figure 4:
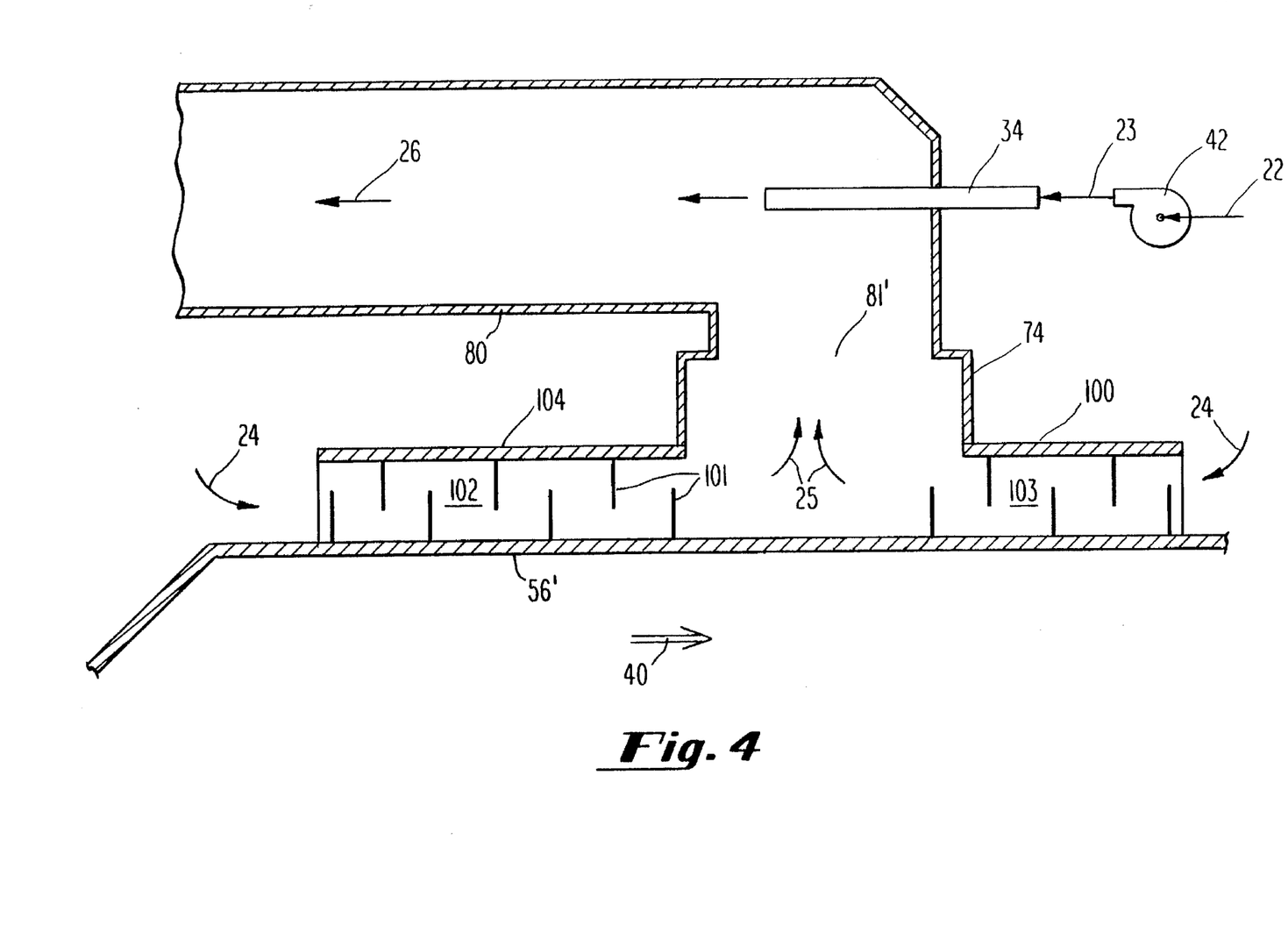
FIG. 4 is a detailed view of an alternate embodiment of the combustor shown in FIG. 2 in the vicinity of the hot gas extraction port.

An alternate embodiment for pre-heating the fuel/air mixture 83 using an indirect heat exchanger 100—that is, a heat exchanger in which heat transfer is accomplished without contact between the hot gas 40 and the fuel/air mixture 83—is shown in FIG. 4. The heat exchanger 100 is formed by a shell 104 that encircles a portion of the liner 56' that encloses the combustion zone 95, thereby forming annular axially extending passages 102 and 103. A plurality of radially extending heat transfer fins 101 extend into the passages 102 and 103. A portion 21 of the compressed air 17 from the compressor 1 is drawn through the passages 102 and 103. As it flows through the passages 102 and 103, the compressed air 21 receives heat transferred to the fins 101 and the liner 56' from the hot gas 40, thereby raising the temperature of the air. From the passages 102 and 103, the heated air 25 enters a circumferentially extending manifold 74 that encircles the shell 104. From the manifold 74, the heated air 25 flows into the inlet of the conduit 80.

As previously discussed, the eductor 33, shown in FIG. 2, could be utilized to induce the flow of compressed air 24 through the heat exchanger 100. Alternatively, as shown in FIG. 4, an eductor 34 could also be incorporated into the duct 80. A portion 22 of the compressed air 17 from the compressor 1 is further pressurized by a boost compressor 42. A high velocity jet of this further pressurized air 25 is then directed into the duct 80 by the eductor 34, thereby drawing the compressed air 24 through the heat exchanger 100.

In the embodiments discussed above, pre-heating is achieved by pre-heating the fuel/air mixture 83 itself. Alternatively, pre-heating can be accomplished by pre-heating the compressed air 18 prior to mixing it with the fuel 30. Such air pre-heating could be accomplished by utilizing only radially extending fuel supply bars 63' (indicated in phantom in FIG. 2) located downstream of the passage 75 so that only air 18 flows through the passage 75. After the compressed air 18 has been pre-heated in the pre-heat zone 91, it would then be mixed with the fuel 30 so as to form a fuel/air mixture.

Regardless of the manner of pre-heating, from the pre-heat zone 91, the pre-heated fuel/air mixture 89 is then directed by a diverging liner 57 to flow through a catalytic reactor 86 containing a combustion catalyst, as shown in FIG. 2. The liner 57 serves to support the catalytic reactor 86 and, at its aft end, encloses two combustion zones, as discussed further below.

In the preferred embodiment, the catalytic reactor 86 comprises a monolithic substrate, which may be formed from a metallic or ceramic material, having a honeycomb structure impregnated with one or more catalytically active materials. The honeycomb structure forms a large number of passages through which the pre-heated fuel/air mixture 89 flows, thereby bring the mixture into surface contact with the catalytic material. Alternatively, other types of catalytic reactors, such as a packed bed type, could also be utilized, provided that they did not impose too great a pressure drop on the gas flow. A variety of combustion catalyst material may be used, such as platinum, palladium or nickel, depending on the type of fuel being combusted. Suitable catalytic reactors are disclosed in U.S. Pat. No. 3,928,961 (Pfefferle) and U.S. Pat. No. 4,072,007 (Sanday), each of which is hereby incorporated by reference in its entirety.

Figure 3:
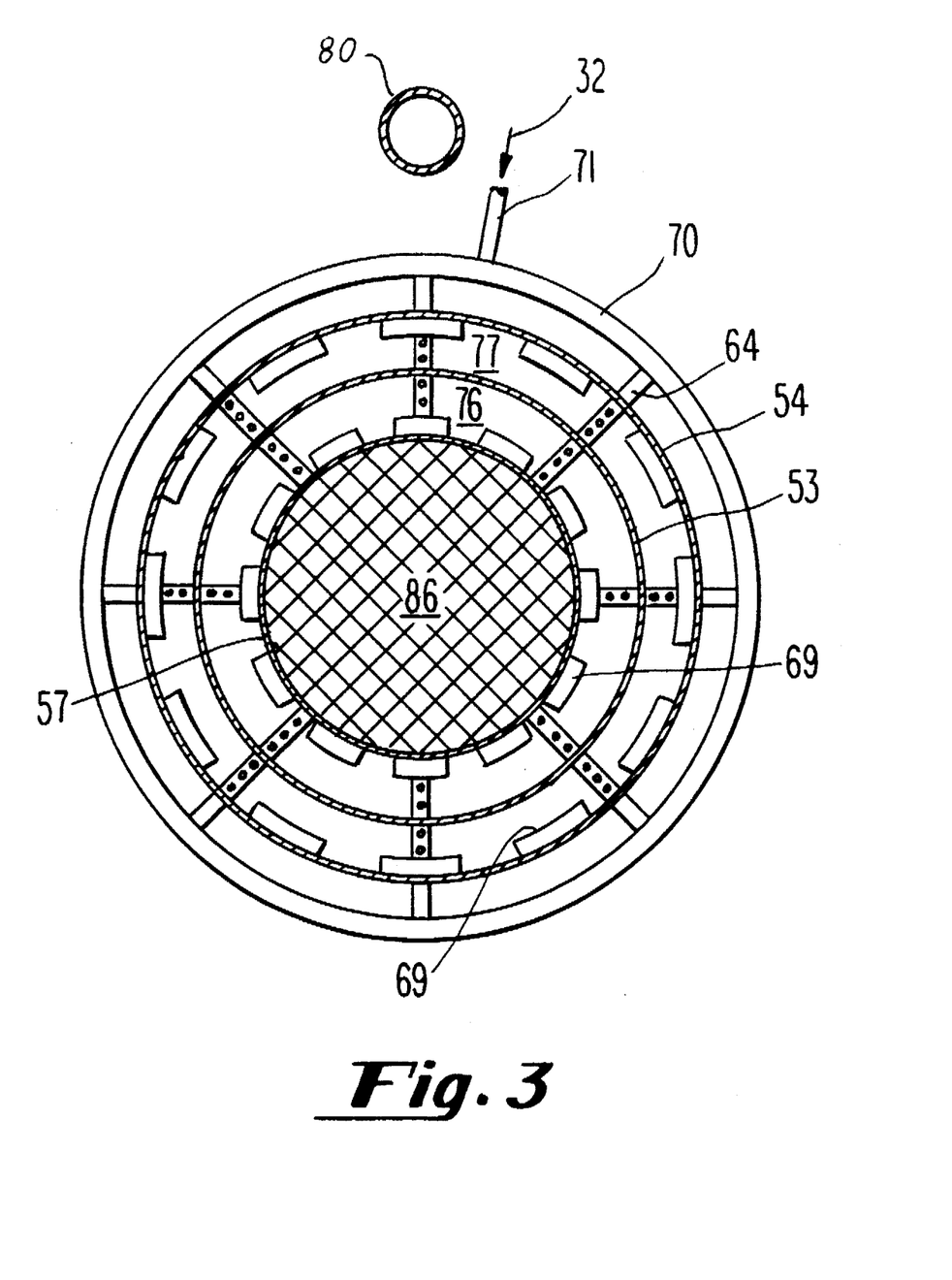
FIG. 3 is a transverse cross-section taken through lines III—III shown in FIG. 2.

As shown in FIGS. 2 and 3, middle and outer cylindrical liners 53 and 54 encircle the liner 57. An outer annular passage 77 is formed between the middle and outer liners 53 and 54 and an inner annular passage 76 is formed between the middle liner 53 and the liner 57. A portion 19 of the compressed air 17 from the compressor 1 enters the inner passage 76 via an inlet 78. Another portion 20 of the compressed air 17 enters the outer passage 77 via an inlet 79. In the preferred embodiment, about 80% of the combustion air for the combustor 15 flows through passages 76 and 77.

As shown in FIGS. 2 and 3, a plurality of radially extending fuel supply bars 64 are circumferentially distributed around the passages 76 and 77 just down stream of the inlets 78 and 79, respectively. A circular manifold 70 distributes fuel 32 from a fuel supply pipe 71 to the various supply bars 64. As shown in FIG. 3, a plurality of fuel outlet ports are distributed along the portion of the length of each of the supply bars 64 that extends in the passages 76 and 77. Consequently, the fuel supply bars 64 serve to well distribute the fuel 32 around the passages, thereby forming lean fuel/air mixtures 84 and 85 in the inner and outer passages 76 and 77, respectively. Preferably, mixing devices are incorporated into the passages 76 and 77 to aid in the mixing of the fuel 32 and compressed air 19 and 20. These mixing devices may be swirl vanes, such as those utilized in passage 75, as previously discussed. Alternatively, radially extending baffles 69 may be distributed around the passages 76 and 77, as shown in FIG. 2. In the preferred embodiment, the flow rate of the fuel 32 introduced by the fuel supply bars 64 into the compressed air 19 and 20 is regulated so that an equivalence ratio of less than 0.5 is maintained in the passages 76 and 77.

As shown in FIG. 2, the liner 57 encloses a combustion zone 93 that is formed immediately downstream of the catalytic reactor 86. A plurality of outlet ports 87 are circumferentially distributed around an outward flaring section of liner 57 that forms an end wall for the inner passage 76. The outlet ports 87 direct the fuel/air mixture 84 into a second combustion zone 94 enclosed by the aft end of the liner 53. A plurality of outlet ports 88 are circumferentially distributed around an outward flaring section of liner 53 that forms an end wall for the outer passage 77. The outlet ports 88 direct the fuel/air mixture 85 into a third combustion zone 95 enclosed by a liner 56. The outlet ports 87 and 88 serve to create pressure drops that prevent the gas in the combustion zones 94 and 95 from flowing backward into the passages 76 and 77. Preferably, the inner surface of the liner 56 is coated with a ceramic material 90 to allow it to better withstand the heat generated in the combustion zone 95.

In the catalytic reactor 86, the pre-heated fuel/air mixture 89 comes into contact with the catalyst's surface. On this surface, fuel is more readily oxidized than in the gas stream because the catalyst alters the reaction mechanism—i.e., reduces the activation energy for the reaction. This oxidation of fuel on the catalyst's surface generates heat that is liberated into the gas stream, increasing its temperature. As its temperature is increased, the rate of oxidation in the gas increases until eventually, downstream of the catalyst bed, it becomes self-sustaining. In addition to the effect of increasing the temperature of the gas, the catalyst injects into it free radicals that accelerate oxidation. Depending on the free radicals, this effect may accelerate oxidation reaction involving fuel to a greater degree than those involving nitrogen, thereby decreasing the proportion of NOx generated. For example, accepted reaction schemes have hydroxyl, OH, and atomic oxygen, O, participating in many reaction steps with methane or its fragments, while these oxidizing radicals participate in fewer elementary reactions with nitrogen. Thus, if the catalyst injects O or OH into the gas stream, one would anticipate that the rate of oxidation of fuel would be more greatly accelerated than that of nitrogen.

As a result of the catalyzation of the fuel/air mixture 83, as described above, upon exiting the catalytic reactor 86, its temperature is rapidly raised above that required for ignition, typically approximately 550° C. Consequently, homogenous gas phase combustion begins in the combustion zone 93 almost immediately after the fuel/air mixture 89 exits the reactor. In the preferred embodiment, the temperature of the fuel/air mixture 89 exiting the catalytic reactor is approximately 480° C. However, as a result of the homogeneous combustion in first combustion zone 93, the temperature of the gas 38 entering the second combustion zone 94 is likely in excess of 1050° C. and preferably, approximately 1230° C.

As a result of the high temperature of the gas 38, the temperature of the fuel/air mixture 84 formed in the inner passage 76 is rapidly raised above its ignition temperature when it enters combustion zone 94 from the outlet ports 87, thereby causing a homogeneous combustion reaction that, in the preferred embodiment, maintains the temperature of the combined gas flow 39 exiting from the second combustion zone 94 above the fuel ignition temperature. Similarly, as a result of the high temperature of the hot gas 94, the temperature of the fuel/air mixture 85 formed in the outer passage 77 is rapidly raised above its ignition temperature as it enters the third combustion zone 39, thereby causing a further homogeneous combustion reaction sufficient to raise the temperature of the hot gas 40 to the desired value for expansion in the turbine section 3.

In the preferred embodiment, the fuel 32 introduced into the inner and outer passages 76 and 77 comprises approximately 80% of the fuel burned in the combustor 15. By introducing this additional fuel and its associated combustion air 19 and 20 sequentially into the combustion products of the catalytic reactor 86 in two stages, quenching of the combustion gas, which could reduce its temperature below that required for ignition, is prevented. Although, for purposes of simplicity, only two stages are shown, it should be understood that three or more stages of combustion may be utilized downstream of the catalytic reactor 86. In any case, due to the absence of locally high temperatures as a result of the lean combustion of the fuel/air mixtures 84 and 85, the generation of NOx is minimized.

As the foregoing indicates, by staging the combustion according to the current invention, with the homogeneous combustion of the second and third fuel/air mixtures 84 and 85 occurring in series with and subsequent to the catalytic combustion of the first fuel/air mixture 83, the generation of NOx is further reduced over that associated with prior lean combustion processes. The catalytic reactor 86 acts as a pilot for the combustion of the lean fuel/air mixtures 84 and 85, thereby allowing operation at very lean fuel/air ratios while providing adequate stability. It is to be noted that this stability is achieved without the generation of additional NOx as a result of the use of diffusion type pilot burners.

In addition to permitting lean combustion without the use of NOx generating pilot burners, it is suspected that the free radicals created by the catalyzation of the fuel/air mixture 83 reduces the NOx generation as a result of the homogenous combustion of the fuel/air mixtures 84 and 85 in another way as well. The free radicals enhance the ability of the fuel to compete with nitrogen for the available oxygen, as previously discussed, so that the NOx generated by the combustion of the fuel/air ratios 84 and 85 is reduced over that associated with non-catalytic combustion even at similarly lean fuel/air ratios. The free radicals also allow combustion to occur at leaner fuel/air ratios than would otherwise be possible.

As previously discussed, preferably pre-heating of the fuel/air mixture 83 is accomplished by heat transfer from the hot gas 39 so as to avoid the generation of additional NOx. However, the staging of the combustion so that not all of the fuel and air flow through the catalytic reactor 86 allows lower values of NOx to be achieved even if the fuel nozzle 50 were used continuously for preheating. This is so because, according to the current invention, the majority of the fuel and air do not flow through the catalytic reactor 86 and, hence, need not be pre-heated. Thus, the amount of fuel burned in the high NOx generating fuel nozzle 50 would be lower than in processes in which all of the fuel and combustion air had to be pre-heated.

The present invention may be embodied in other specific forms without departing from the spirit or essential attributes thereof and, accordingly, reference should be made to the appended claims, rather than to the foregoing specification, as indicating the scope of the invention.

We claim:

1. A combustor for burning a fuel in air, comprising:

a) means for mixing a first flow of fuel into a first flow of air in a mixing zone, thereby producing a first fuel/air mixture;

b) a combustion catalyst, and means for directing said first fuel/air mixture through said catalyst so as to produce a catalyzed fuel/air mixture;

c) a first combustion zone in which said catalyzed fuel/air mixture is combusted, thereby producing a combusted gas;

d) a second combustion zone disposed downstream of said first combustion zone, and means for directing said combusted gas from said first combustion zone to said second combustion zone;

e) means for mixing a second fuel/air mixture into said combusted gas in said second combustion zone and combusting said second fuel/air mixture, thereby producing a further combusted gas;

f) a third combustion zone disposed downstream of said second combustion zone, and means for directing said further combusted gas from said second combustion zone to said third combustion zone;

g) means for mixing a third fuel/air mixture into said further gas in said third combustion zone and combusting said third fuel/air mixture, thereby producing a still further combusted gas; and h) means for transferring heat from said still further combusted gas to said first fuel/air mixture for heating said first fuel/air mixture prior to directing said first fuel/air mixture through said combustion catalyst.

2. The combustor according to claim 1, further comprising means for mixing a second flow of fuel into a second flow of air so as to produce said second fuel/air mixture, and wherein said second flow of fuel and air mixing means comprises an annular passage encircling said combustion catalyst.

3. The combustor according to claim 2, further comprising means for mixing a third flow of fuel into a third flow of air so as to produce said third fuel/air mixture, and wherein said third flow of fuel and air mixing means comprises a second annular passage encircling said annular passage.

4. The combustor according to claim 3, wherein said means for transferring heat comprises means for mixing at least a portion of said still further combusted gas into said first fuel/air mixture.

5. The combustor according to claim 4, wherein said means for mixing said still portion of said still further combusted gas into said first fuel/air mixture comprises an eductor.

6. The combustor according to claim 3, wherein said means for heating said first fuel/air mixture comprises means for mixing at least a portion of said still further combusted gas into said first flow of air prior to mixing said first flow of fuel therein.

7. The combustor according to claim 6, wherein the step of mixing said portion of said still further combusted gas into said first flow of air comprises educting said still portion of said still further combusted gas.

8. A method of combusting a fuel in air, comprising the steps of:

a) mixing a first flow of fuel into a first flow of air so as to form a first fuel/air mixture;

b) flowing said first fuel/air mixture through a combustion catalyst, thereby producing a catalyzed fuel/air mixture;

c) combusting said catalyzed fuel/air mixture, thereby producing a combusted gas;

d) mixing a second flow of fuel into a second flow of air so as to form a second fuel/air mixture;

e) combusting said second fuel/air mixture by mixing said second fuel/air mixture into said combusted gas so as to raise the temperature of said second fuel/air mixture above its ignition temperature, thereby producing a further combusted gas;

f) mixing a third flow of fuel into a third flow of air so as to form a third fuel/air mixture;

g) combusting said third fuel/air mixture by mixing said third fuel/air mixture into said further combusted gas, thereby raising the temperature of said third fuel/air mixture above its ignition temperature, thereby producing a still further combusted gas; and h) transferring heat from said still further combusted gas to said first fuel/air mixture for heating said first fuel/air mixture prior to flowing said first fuel/air mixture through said combustion catalyst.

9. The method according to claim 8, wherein:

a) the step of combusting said catalyzed fuel/air mixture occurs in a first combustion zone of a combustor, said first combustion zone being disposed downstream from said catalyst; and b) the step of mixing and combusting said second fuel/air mixture occurs in a second combustion zone disposed downstream from said first combustion zone.

10. The method according to claim 14, wherein:

a) the step of combusting said catalyzed fuel/air mixture occurs in a first combustion zone of a combustor, said first combustion zone disposed downstream from said catalyst;

b) the step of mixing and combusting said second fuel/air mixture occurs in a second combustion zone disposed downstream from said first combustion zone; and c) the step of mixing and combusting said third fuel/air mixture occurs in a third combustion zone disposed downstream from said second combustion zone.

11. The method according to claim 8, wherein the step of heating said first fuel/air mixture comprises heating said first fuel/air mixture to at least approximately 400° C.

12. The method according to claim 11, wherein the step of transferring heat from said still further combusted gas to said still first fuel/air mixture comprises mixing at least a portion of said further combusted gas into said still first fuel/air mixture.

13. The method according to claim 12, wherein the step of mixing said portion of said still further combusted gas into said first fuel/air mixture comprises educting said portion of said still further combusted gas.

14. The method according to claim 13, wherein the step of educting said still portion of said still further combusted gas comprises flowing said first fuel/air mixture through a first conduit, said first conduit connected to a second conduit in flow communication with said still further combusted gas.

15. The method according to claim 8, wherein the step of transferring heat from said still further combusted gas to first fuel/air mixture comprises transferring heat without mixing of said still further combusted gas and first fuel/air mixture.

* * * * *